United States Patent Office 3,210,946
Patented Oct. 12, 1965

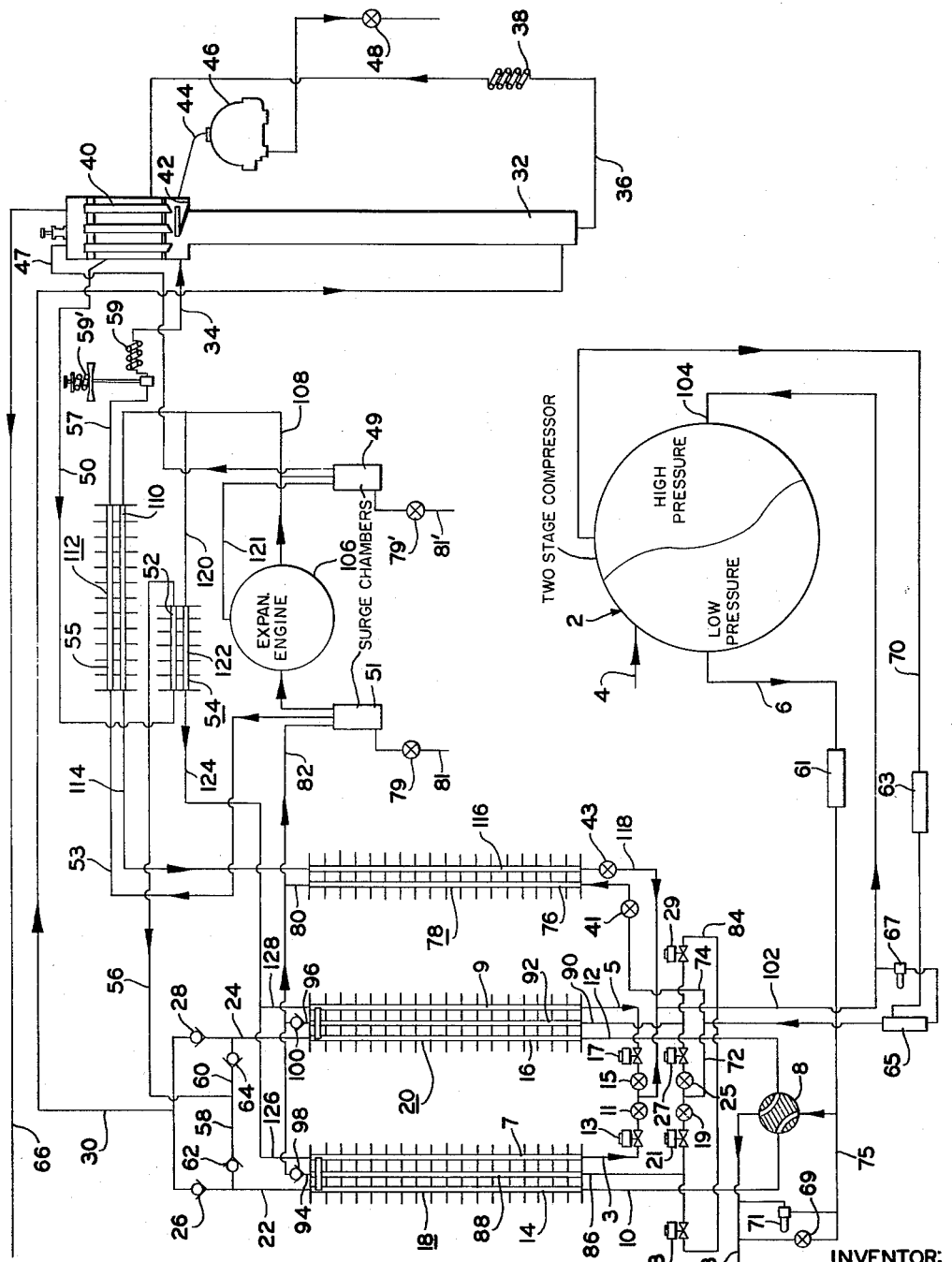

3,210,946
CRYOGENIC COOLING OF REVERSIBLE
HEAT EXCHANGERS
Robert W. Hughes, Greensburg, Pa., assignor to Joy Manufacturing Company, Pittsburgh, Pa., a corporation of Pennsylvania
Filed Dec. 12, 1960, Ser. No. 75,152
3 Claims. (Cl. 62—13)

This invention relates to cryogenic apparatus and the method for the separation of components of a gaseous mixture and more particularly to the separation of gaseous components of air to provide at least one component thereof as a substantially pure product.

As is well known, the gases which are found naturally or are available from or during some processes are frequently composed of a mixture of various gases each of which has its own physical properties. One particularly desirable manner of separating the components of such gaseous mixtures is by employing cryogenic processes which operate at absolute temperatures (degrees Kelvin—° K) substantially below the condensation temperature, i.e. the temperature at which freezing, solidification or liquefaction of some of the components of the mixture occurs. Under such circumstances it is necessary, particularly with reference to a continuous process, that gases which condense at higher temperatures than that of the desired product be removed from the gaseous mixture prior to introducing the remaining mixture of gases to the cryogenic separating process as failure to remove such condensable gases causes blocking of the passageways in the apparatus. Such condensable gases, which are often referred to as higher boiling point impurities, have heretofore been removed from the incoming gaseous mixture by means of reversing heat exchangers or regenerators which heat exchangers have passageways therein in which the condensable gases are condensed. Such heat exchangers also have an additional passageway for use in a subsequent step in which subsequent step the solidified condensable gases are removed from the heat exchangers. Thus, it is known in a continuous process for separating the components of gas to use one heat exchanger for liquefying or solidifying certain gaseous components of the gas therein while simultaneously removing previously liquefied or solidified gaseous components from the other of the heat exchangers and thereafter reversing the process flow to the heat exchangers whereby their functions are reversed. Such reversal of function of the heat exchangers causes cold fluid to flow in heat exchange relationship with the additional passageway. Under such circumstances if any gas or liquid substance remains within the additional passageway heat loss will occur from the cold fluid to the gas or liquid substance in the additional passageway. It will readily be appreciated that since cryogenic processes operate at extremely low temperatures, it is necessary, in order to obtain maximum efficiency, to hold any heat or thermal loss to a minimum.

Accordingly, one object of this invention is to provide new and improved apparatus for separating the components of a mixture of gases to obtain one component thereof as a substantially pure product by means of a heat exchanger having a passageway which is vented during the period another passageway in the heat exchanger has another gas of the process flowing therethrough.

Another object of this invention is to provide new and improved apparatus for separating the components of a mixture of gases to obtain one component thereof as a substantially pure product by means of a heat exchanger in which, during alternating periods, warm and cold streams (relatively compared) flow in heat exchange passageways and means are provided for venting the warm stream passageway during the period the cold stream flows through the heat exchanger whereby heat exchange therebetween is reduced.

Still another object of this invention is to provide a new and improved method for separating the components of a mixture of gases to obtain one component thereof as a substantially pure product by means in which a high pressure fluid passageway employed during one part of the process is vented during a subsequent part of the process.

A more specific object of this invention is to provide new and improved apparatus for separating the components of a mixture of gases to obtain one component thereof as a substantially pure product by means of a pair of heat exchangers each having a first passageway therein through which a pressurized fluid flows during a given period of use and a second passageway through which a cold refrigerant flows during a subsequent period of use and which first and second passageways are used alternately by the high pressure fluid and the cold refrigerant, and means are connected to each of the first passageways to vent the first passageway of a given heat exchanger when a cold refrigerant flows through the second passageway of the given heat exchanger.

These and other objects of this invention will become more apparent upon consideration of the following detailed description of a preferred embodiment thereof when taken in conjunction with the following drawing which represents a schematic view of cryogenic apparatus constructed in accordance with the principles of this invention.

Although it will be realized that the principles of this invention are applicable to the separation of one or various components from a mixture of gases, for the purpose of best understanding the principles of this invention, the description herein is made with reference to utilizing atmospheric air as the process or incoming mixture of gases the components of which are separated to provide substantially pure nitrogen. As shown in the drawing, the cryogenic apparatus of this invention comprises a suitable air compressor 2 having a suitable atmospheric air intake 4 and a high pressure process air discharge line 6 which discharge line 6 is connected to a suitable dual passageway reversing valve 8. Separate suitable process air lines 10 and 12 are suitably connected to the reversing valve 8 and to one ends of elongated passageways 14 and 16 in separate suitable heat exchangers 18 and 20, respectively. The reversing valve 8 is connected to a suitable atmospheric exhaust line 68 and is of any suitable structure so that in one operating position the process air is directed to line 10 and the line 12 is connected to the atmosphere through line 68; conversely, when the operating position of the valve 8 is reversed the process air is directed to line 12 and the line 10 is connected to the atmosphere through line 68. The other ends of the passageways 14 and 16 are connected by suitable lines 22 and 24 having suitable check valves 26 and 28 therein, respectively, to a suitable line 30; which line 30 is suitably connected to the lower end of a suitable rectification column 32 for producing enriched liquid nitrogen. It will be realized that columns such as column 32 are commonly referred to as either pressure, fractionating, distillation or rectification columns and that the structure of this invention is operable with all such columns.

It will be realized that starting up a rectification column 32 involves different thermal conditions or, if desired, different operation of the cryogenic apparatus than continuous operation; however, such starting up is well known and description thereof is not believed to be necessary (see for example Collins Patent No. 2,763,137). Accordingly, this description is with reference to a continuous process in which the hereinafter described pressure and temperature flow controls are known to exist. Cleansed process air enters the column 32 at a temperature substantially that of the saturation temperature with reference to the operating pressure of the column 32 so that the process air is introduced into the column 32 as a gas at or near the saturation temperature or as a combination of liquid and gaseous air. Thus, for example, the column 32 may be operated at a pressure of 5 atmospheres, the incoming process air being substantially at a temperature of 98° to 102° Kelvin. Also, after start up has occurred, liquid nitrogen flows into the column 32 from a suitable line 34 and at the operating pressure of the column 32 (5 atmospheres). At such pressure the boiling point of liquid nitrogen is lower than that of liquid oxygen so that as the gaseous components of the process air mixture flows upwardly from the bottom of the column 32 and as the liquid nitrogen descends in the column 32, in the form of a liquid nitrogen rain, the gaseous oxygen is condensed by the nitrogen rain and the descended liquid nitrogen at the bottom of the column 32 evaporates and rises to the top of the column 32.

The liquid oxygen-air mixture at the bottom of the column 32 flows through a suitable line 36 from the bottom of the column 32 through a suitable restrictor means 38 and into the interior of a boiler condenser portion 40 at the upper end of the column 32. The restrictor 38 may be of any suitable structure whereby the pressure of the oxygen-air mixture in line 36 is reduced simultaneously causing the temperature of the oxygen-air mixture to be reduced to a sufficient degree so that the liquid oxygen-air mixture absorbs heat from the gaseous products in the upper end of the column 32. Such heat absorption by the reduced pressure liquid oxygen-air mixture causes boiling of the oxygen-air mixture and condensation of a substantial portion of the gaseous nitrogen rising in the boiler condenser portion 40 to carry with the introduced liquid nitrogen any final traces of gaseous oxygen to the lower portion of the column 32. This process results in nitrogen of high purity, either liquid or gaseous, at the top of the column 32 and a mixture of oxygen enriched liquid air at the bottom of the column 32.

As is known, a portion of the liquid nitrogen product is suitably directed to flow downwardly in the condenser portion 40 to the nitrogen shelf 42 immediately below the boiler condenser portion 40 and accumulates thereat so as to be removed in any suitable manner such as by flow through a suitable conduit 44 connected to the shelf 42 having a suitable drain valve 46 therein which permits liquid nitrogen to be discharged therefrom without loss of pressure or vapor from the column 32. If desired a manual valve 48 is connected adjacent the discharge end of the line 44 to permit containers for receiving the liquid nitrogen to be positioned thereat. At the same time gaseous nitrogen in the column 32 exits through a suitable line 47 connected to the upper end of the boiler condenser portion 40 to a suitable portion of the discharge of the expansion engine 106 such as a suitable discharge surge chamber 49 shown.

The boiled off or gaseous oxygen enriched air mixture or effluent waste gas flows outwardly from the boiler condenser portion 40 through a suitable line 50 to one end of a suitable passageway 52 in a suitable heat exchanger 54 and exits from the other end thereof through a suitable line 56 which is connected to separate suitable lines 58 and 60. Lines 58 and 60 have suitable check valves 62 and 64 therein and are suitably connected to lines 22 and 24 respectively. As is known, a suitable line 66 is preferably provided at the upper end of the column 32 for bleeding off rare gases in a manner well known in the art and which line 66 may be placed in heat exchange relationship with the incoming air mixture in either or both of the heat exchangers 18 and 20.

The major portion of the structure heretofore described relates to the supply and flow of the process air in the various portions of the cryogenic apparatus. It will be appreciated that the process air undergoes various temperature, pressure and state transformations in order to carry out the cryogenic process. In order to obtain the desired temperature conditions in the process air in certain portions of the cryogenic apparatus a refrigeration cycle is also provided in which high pressure warm and low pressure cold refrigeration are circulated. It will be realized that in cryogenic apparatus and processes the terms warm and cold are relative to each other and that the term warm in a cryogenic sense may be extremely cold from many other standpoints such as human comfort. In order to obtain the different pressure refrigerants the refrigeration cycle includes a suitable one or two stage compressor which, if desired, is a component of the compressor 2 having a high pressure discharge line 70 which is connected to suitable separate lines 72 and 74, the line 74 of which is connected to one end of a suitable passageway 76 in a suitable heat exchanger 78. A suitable flow control valve 41 is connected in the line 74 to control the flow therethrough. Although the low pressure refrigerant may be compressed to any suitable high pressure a pressure of 36 atmospheres has been used for successful operation of the described process. The other end of the passageway 76 is connected by a suitable line 80 to a suitable line 82. The other line 72 is connected to a suitable line 84, which is in the form of a closed loop, which loop is connected by a suitable line 86 to one end of a suitable passageway 88 in the heat exchanger 18 and by a suitable line 90, spaced from the line 86, connected to one end of a suitable passageway 92 in the heat exchanger 20. The other ends of the passageways 88 and 92 are connected by suitable lines 94 and 96 having suitable check valves 98 and 100 therein respectively to the line 82. The line 84 is also connected by a line 102 to the intake 104 of the refrigerating compressor portion of the compressor 2.

The high pressure refrigerant in line 82 is connected to the high pressure inlet side of expansion engine 106 wherein the high pressure refrigerant is expanded to a lower pressure to substantially reduce the pressure and temperature of the refrigerant. All the low pressure refrigerant is discharged from the engine 106 through a suitable discharge line 108 having the surge chamber 49 suitably connected therein and thereafter the line 108 is connected to one end of a suitable passageway 110 in a heat exchanger 112. The surge chamber 49 communicates through a suitable line 121 with the cylinder portion of the expansion engine on the dead side of the piston (not shown) to provide surge volume and avoid pressure build-up in that portion of the cylinder. The other end of passageway 110 is connected by a suitable line 114 to one end of a suitable passageway 116 in the heat exchanger 78. The discharge side of passageway 116 is connected by a suitable line 118, having a suitable flow control valve 43 therein, to the line 102 and to a pair of suitable lines 3 and 5. Lines 3 and 5 are connected to one end of passageways 7 and 9 in heat exchangers 18 and 20 respectively. The line 108 is also connected by a suitable line 120 to one end of a passageway 122 in the heat exchanger 54 the other end of which is suitably connected to a suitable line 124 which in turn is connected to the lines 126 and 128. Lines 126 and 128 are connected to the other ends of the passageways 7 and 9 in the heat exchangers 18 and 20, respectively.

In order to provide proper control of the low pressure refrigerant in the heat exchangers 18 and 20 a suitable control valve 11 and a suitable solenoid valve 13 are connected in series in the line 3 and a suitable control valve 15 and a suitable solenoid valve 17 are connected in series in the line 5. In order to provide proper control of the flow of the high pressure refrigerant in the heat exchangers 18 and 20 suitable controls are connected in the line 84 comprising a suitable control valve 19 and a suitable solenoid valve 21 connected in series between the lines 72 and 86, a suitable control valve 25 and a suitable solenoid valve 27 connected in series between the line 72 and the line 90, a suitable solenoid valve 23 connected between the line 86 and the line 102, and a suitable solenoid valve 29 connected between the line 90 and the line 102.

For the purpose of initially describing the operation of the cryogenic apparatus heretofore described the reversing valve 8 will be considered as being in the position shown whereby the high pressure process air flows through the discharge line 6 from the compressor 2 through the valve 8, line 10, passageway 14 in heat exchanger 18, line 22 having check valve 26 therein to the line 30 and thence to the column 32. In order to obtain proper quantity of flow throughout the various portions of the apparatus the flow valves 11, 15, 19, 25, 41 and 43 are all open a sufficient degree to provide the necessary restriction in the various lines. As indicated, low pressure gaseous refrigerant flows from the discharge side of the expansion engine 106 through line 108, line 120, passageway 122 of the heat exchanger 54, lines 124 and 126, through the passageway 7 of the heat exchanger 18, through line 3 in which valves 13 and 11 are open to line 118, line 102 to the inlet 104 of the refrigeration portion of the compressor 2. During such flow the valve 17 is closed so that no low pressure cold refrigerant flows through line 128, and passageway 9 of the heat exchanger 20, and line 5. The check valve 28 in line 24 and the check valve 62 in line 58 prevent process air from flowing through any discharge path other than that as described inasmuch as the effluent gas in lines 56, 60 and 24 is at substantially less pressure. Thus process air and cold low pressure gaseous refrigerant flow in counterflow relationship in the heat exchanger 18 and by providing a sufficient quantity of cold refrigerant at a sufficiently low temperature the gaseous components in the process air which have a higher freezing point than the freezing point of the components utilized in the remainder of the process are solidified within the passageway 14. Thus all water vapor is condensed or frozen out as are the carbon dioxide and other condensable gases. Dust particles which may be present in the process air are removed by being utilized as condensation nuclei for the condensing vapors within the passageway 14.

It will be realized that the solidification of the condensable impurities is quite important to the operation of such cryogenic apparatus in order to prevent the column 32 or the entire process from becoming inoperative due to accumulations of components such as frozen water vapor in other portions of the cryogenic apparatus. Accordingly, it is highly desirable that the incoming temperature of the cold refrigerant to the passageway 7 be both substantially uniform in temperature and sufficiently low in temperature to insure deposition (which is usually solidification) of all impurities within the passageway 14. In order to achieve such control of the gaseous low pressure cold refrigerant the cold refrigerant from the expansion engine 106 passes in counterflow heat relationship with the cold effluent gas exiting through line 50 from the column 32 and passing through the passageway 52 in the heat exchanger 54, simultaneously the cold refrigerant passes through the line 120 and passageway 122 in the heat exchanger 54. Thus the heat exchanger 54 utilizes the cold of the cold effluent gas to maintain the desired temperature of the cold refrigerant prior to its introduction to the heat exchangers 18 or 20.

It will be realized that after sufficient quantities of impurities are solidified within the passageway 14, the passageway 14 becomes clogged so that it is necessary for a continuous operation to have the process air and cold refrigerant transferred to another heat exchanger so as to insure that purified process air is continuously available. In order to provide such continuous supply of purified process air, the heat exchanger 20 is provided for use immediately after use of the heat exchanger 18 in which by operation of the reversing valve 8 process air flows from the valve 8 to line 12, through passageway 16 in heat exchanger 20 and exits through the check valve 28 in line 24 to the line 30 and thence to the column 32. Check valve 64 in line 60 and check valve 26 in line 22 prevent process air from flowing in any other exit path as low pressure effluent gas now flows in lines 56, 58 and 22. Upon reversal of the reversing valve 8 valve 13 is closed and valve 17 is opened whereby flow of low pressure gaseous cold refrigerant through the passageway 7 is stopped and such cold refrigerant is directed from the heat exchanger 54 through the lines 124 and 128, passageway 9 of heat exchanger 20, line 5 having open valves 15 and 17 therein, lines 118 and 102 to the inlet 104 of the refrigeration portion of the compressor 2. Thus, the process air and cold refrigerant are in counterflow heat exchange relationship in the heat exchanger 20 to again provide for the solidification of impurities in the passageway 16 of the heat exchanger 20 in the manner as heretofore described.

It will again be appreciated that as the process air traverses the passageway 16 and deposits solidified impurities therein the passageway 16 becomes clogged and it is necessary to direct the process air to another heat exchanger which in this case is passageway 14 of the heat exchanger 18 which has been cleansed during the period the passageway 16 was used for depositing solidified impurities. Such cleansing of the passageway 14 is obtained by directing a warming fluid therethrough which warms the deposited impurities in the passageway 14 and exhausts them to the atmosphere or a suitable collecting chamber, not shown. Such warming up of the passageway 14 is accomplished by directing the effluent gas which has suitably absorbed heat and as described has absorbed heat from the refrigerant passing through heat exchanger 54 and consequently is higher in temperature than its exit temperature from the column 32, through the lines 56 and 58 having the check valve 62 therein, line 22, passageway 14, line 10, reversing valve 8 to the exit line 68. The effluent gas may be at a sufficiently high temperature as it leaves heat exchanger 54 to elevate the temperature of the deposited impurities in the passageway 14 above their vaporization temperature so that the deposited impurities are melted and flow out of the passageway 14 with the exhaust effluent gas or exhausted in any other suitable manner.

Inasmuch as the effluent gas passageway is open to atmosphere and the process air is at a high pressure, the pressure of the process air flowing through the passageways biases the various check valves, as heretofore indicated, closed to prevent effluent gas from becoming mixed with the process air. In addition, the high pressure gaseous warm refrigerant flows through line 70, line 72, line 86 with open valves 19 and 21 therein, passageway 88, line 94 having check valve 98 therein, line 82 to the inlet side of the expansion engine 106. Thus the high pressure warm refrigerant gives up heat when flowing through the passageway 88 to the exiting effluent gas flowing in the passageway 14 to insure that all impurities in the passageway 14 are melted. At the same time the warm refrigerant transfers heat to the effluent gas to reduce the temperature of the warm high pressure refrigerant as it enters the expansion engine 106. In order to provide the make up nitrogen through line 34 a suitable portion of the warm refrigerant is diverted from line 80 which, as shown, is accomplished by a suitable inlet surge chamber 51 connected in the line 82 ahead of the inlet of the expansion engine 106 which surge chamber has a suitable exit line 53 connected to one end of a suitable passageway 55 in the heat exchanger 112, the other end of which passageway 55 is connected by a suitable line 57 to one side of a suitable regulating means 59. The opposite end of the regulating means 59 is connected to the line 34.

After the passageway 14 has been purged or cleansed of the previously deposited impurities the process air is again returned to the passageway 14 by reversing the valve 8 and the cold refrigerant again traverses the passageway 7 in the manner as heretofore indicated whereby the initially described operation of the column 18 is reinstated. At the same time reversal of the valve 8 connects the effluent gas flowing through the passageway 52, the line 56, the line 60, passageway 16, line 12, valve 8 to the exit line 68. Thus during the period that the heat exchanger 18 is being used for the process air the heat exchanger 20 is being cleansed of its deposited impurities so that it may be used for the subsequent reversing of the process air from the heat exchanger 18 to the heat exchanger 20. At the same time warm refrigerant is again supplied in counterflow heat relationship with the effluent gas by being directed from line 70 through line 72, open valves 25 and 27 in line 84, line 90, passageway 92, line 96 having check valve 100 therein to the line 82. Upon opening of the valve 27 the valve 21 is closed, the high pressure warm refrigerant is no longer directed to the passageway 88 in heat exchanger 18 so that the high pressure refrigerant in line 82 biases the check valve 98 closed to prevent warm refrigerant from entering in a reverse manner to the passageway 88.

The high pressure warm refrigerant is also continuously cooled by cold refrigerant flowing in countercurrent heat exchange relationship in the heat exchanger 78. Thus it will be noted that the high pressure gaseous warm refrigerant flows continuously from line 70 through line 74, passageway 76 to the line 82. Such flow is controlled but not by any of the valves heretofore described. At the same time low pressure gaseous cold refrigerant flows from the line 108 through passageway 110 in heat exchanger 122, line 114, passageway 116 in heat exchanger 78, line 118 to line 102 to the inlet 104 of the refrigerant side of the compressor 2. Such cold refrigerant is also not affected by any of the valves previously described so as to be in continuous heat exchange relationship with the warm refrigerant. By providing such flow in the heat exchanger 78 variations in the quantity of warm or cold refrigerant in any of the heat exchangers may be obtained as desired. Such variation in refrigerant flow is particularly desirable prior to reversing the heat exchangers and after the effluent gas has removed or substantially removed all the impurities in the passageway 16. At that time valve 27 can be closed whereby the flow of warm refrigerant through the passageway 92 is discontinued prior to changing the process air from passageway 14 to passageway 16. By such early discontinuing of the warm refrigerant flow while continuing the flow in the effluent passageway 16 the temperature of the heat exchanger 20 is lowered. The discontinued stream of warm refrigerant in passageway 92 then flows through passageway 76. Also, if desired, upon discontinuing the warm refrigerant flow through the passageway 92 cold refrigerant flow can be established through the passageway 9 by opening the valve 17 while leaving the valve 13 open so that the temperature of the heat exchanger 20 is lowered even further than by the effluent stream flow in pasasgeway 16 so that the heat exchanger 20 is ready for immediate use upon the reversing of the process air to the passageway 16. Accordingly, since variable volume flow of warm and cold refrigerant occurs the heat exchanger 78 is employed to permit such variations in volume. It will be appreciated that the warm and cold refrigerant flows are stopped and started in the heat exchanger 18 during the period deposited impurities are removed in the same manner as described with relation to heat exchanger 20.

As indicated the make up nitrogen flows through the pasasgeway 55 in counterflow heat relationship with cold refrigerant in the passageway 110 in the heat exchanger 112. Such counterflow of the warm and cold refrigerant is of sufficient quantity so that the warm high pressure gaseous nitrogen refrigerant in the passageway 55 is liquefied and flows from the heat exchanger 112 through line 57 to the regulator means 59 whereby it is reduced from the operating pressure of the high pressure warm refrigerant to the operating pressure of the column 32. Although various suitable pressure reducing means may be employed, desirably the regulator means 59 is of a type so as to sense the flow therethrough whereby a constant quantity of flow of liquid make up nitrogen is supplied to the column 32 regardless of pressure variations in the make up line prior to the regulator means 59. Accordingly, a suitable flow regulating device 59' for such purpose is located in line 57 ahead of the flow of high pressure refrigerant to the regulating means 59. It will be appreciated that a make up line 34 is not essential for a nitrogen process; however, such is preferred in this instance. Consequently in order to provide in effect a closed refrigeration circuit a suitable tap line 47 is connected to the top of the boiler portion 40 of the column 32 which conducts gaseous nitrogen to a suitable surge chamber 49 connected in the discharge line 108 from the expansion engine 106. Thus the quantity by weight of liquid and gaseous nitrogen introduced by line 34 is equal to the quantity by weight of gaseous nitrogen exiting from the column 32 through line 47 so that the refrigeration cycle is in effect a closed refrigeration cycle. In view of the quantity of heat required to liquefy the quantity of the high pressure gaseous warm refrigerant the greater quantity of low pressure gaseous cold refrigerant flows through the passageway 110. Thus approximately 10% of the incoming warm refrigerant in line 82 flows through the heat exchanger 112 and approximately 70% of the low pressure refrigerant in line 108 flows through the heat exchanger 112 to obtain the desired liquefaction of make up nitrogen. Although the figures indicated are not controlling, they are indicative of the variations employed.

With the process as heretofore described during the periods the high pressure refrigerant flows through the passageway 92 the valve 21 is closed and the check valve 98 is biased closed so that no high pressure refrigerant flows in the passageway 88 of heat exchanger 18. It will be appreciated, however, that during the closing of any valves at opposite ends of the line containing a gaseous substance it is impossible without use of auxiliary means to eliminate all gas in the closed line. Thus, after warm refrigerant flow in passageway 88 is stopped and process air and cold refrigerant flows are reestablished in passageways 14 and 7, respectively, a quantity of warm nitrogen refrigerant remains in the passageway 88. Such a condition requires the reestablished cold refrigerant flow through the passageway 7 to cool down the residual warm refrigerant in the passageway 88. Such condition is more pronounced when the residual gas is under high pressure as in this case. In practice the cold refrigerant flow in passageway 7 is at a sufficiently low temperature to cause the residual warm refrigerant in passageway 88 to condense and thus cause a considerable loss of refrigeration of the cold refrigerant flow. In order to prevent such liquefaction of the warm refrigerant the valve 23 is opened upon closing the valve 21 so that the high pressure gaseous refrigerant is vented from the passageway 88 through the line 86, the portion of line 84 having the open valve 23 therein, to the line 102 so that the high pressure refrigerant is returned to the low pressure side of the refrigeration cycle, valve 29 being closed. Similarly high pressure warm refrigerant is vented from passageway 92 through line 90, the portion of line 84 having open valve 29 therein to line 102, valve 27 being closed during such venting. In addition, any leakage of warm high pressure refrigerant past the check valves 98 and 100 when the passageways 88 and 92, respectively, are not in use, will also be vented to the low pressure side of the refrigeration cycle in the same manner.

It will be noted that there have been diagrammatically illustrated various components which may be employed in the cryogenic apparatus of this invention. Thus suitable aftercoolers 61 and 63 may be provided in lines 6 and 70 to cool the process air and high pressure refrigerant, respectively. A suitable oil and/or water vapor separator 65 may also be provided in the exit line 70 of the high pressure refrigerant which is connected to a suitable line having suitable pop valve 67 therein, the other end of which line is connected to the line 102 so that should the pressure of the high pressure nitrogen become too great it is releasable to the low pressure side of the compressor without loss of refrigerant. Similarly a suitable line 75 is connected to the line 6 shunting the valve 8 which line 75 has a suitable valve 69 therein. Line 75 is connected to the exit line 68 so that if necessary during start up high pressure process air may be released directly to the atmosphere through the waste line 68. Also, if desired, a suitable pop valve 71 may be connected by a suitable line 77 between the waste line 68 and the line 6 to prevent excess pressure from building up in the process air side. Also suitable drain valves 79 and 79' contained in suitable drain lines 81 and 81' are connected to the inlet and discharge surge chambers 51 and 49 respectively. A suitable line 121 is connected to the surge chamber 49 so that cold refrigerant is directed to desired portions of the expansion engine 106 to maintain desired temperatures therein. It will be obvious to those skilled in either the cryogenic or control arts that such controls may readily be controlled in a suitable manner such as by being electrically energized or deenergized to obtain the requisite operation and the time relationships between their operation.

Thus, it will be noted that this invention provides for increasing the efficiency of reversing heat exchangers by venting the high pressure flow stream during the period that condensable gases are deposited in the heat exchangers. In particular the warm refrigerant is vented to the cold refrigerant side at the point that the cold refrigerant is at substantially its highest temperature so that not refrigeration capacity is lost. In addition, such improvement is readily accomplished by inexpensive control components which may readily be installed on new or existing apparatus.

From this description it will be realized that the valves 13, 17, 21, 23, 27 and 29 open and close the respective lines in which they are connected to control whether any flow can occur as distinguished from the control valves 14, 15, 19, 25, 41 and 43 which control the quantity of flow. Accordingly, any suitably controllable valve structure may be employed for the valves 13, 17, 21, 23, 27 and 29. Heretofore the term solenoid valve has been used to identify such valves, as solenoid valves are one type of satisfactory valve and such terminology clarifies the description of this invention. In addition it will be realized that during one operating period with the valve 8 in one position the valves 13, 27 and 23 are open and the valves 17, 21 and 29 are closed; conversely, with the valve 8 in the other operating position the valves 13, 27 and 23 are closed and the valves 17, 21 and 29 are open. If desired, the valves 13, 27, 23, 17, 21 and 29 can be controlled for simultaneous operation or with time increments between actuations. Variations in the time of operation of the valves are desirable to obtain modification of the operating cycle of the described apparatus such as the variation shown in Serial No. 696,522, filed November 14, 1957, now U.S. Patent No. 3,060,697. Also, if desired, the specific number of heat exchangers shown and described need not be employed as the principles of this invention are applicable to venting any passageway of any heat exchange means when it is desired to prevent loss of refrigerant capacity to a passageway which does not have a flow therethrough.

It will be noted that all of the check valves heretofore described are operable to obtain the desired flow as described since the effluent or waste gas stream is at a substantially lower pressure than that of the process air so that the check valves in the connections between the two streams are biased closed by the process air to prevent effluent from mixing with the process air. In order to achieve such control it will be noted that the line 58 is connected to the line 22 between the passageway 14 and the check valve 26 and that the line 60 is connected to the line 24 between the passageway 16 and the check valve 28.

Having described a preferred embodiment of this invention in accordance with the patent statutes, it is to be realized that modifications thereof may be made without departing from the broad spirit and scope of the invention. Accordingly, it is respectfully requested that this invention be interpreted as broadly as possible and be limited only by the prior art.

I claim:

1. A method of separating the gaseous components of a mixture of gases in which a first stream of a mixture of gases flows in heat exchange relationship in a heat exchange means with a second stream and said first and second stream flows are subsequently discontinued and a third stream from the high pressure portion of a circuit having high pressure and low pressure portions is passed at said high pressure and at a temperature substantially different from the temperature of said first stream and from the temperature of said second stream through said heat exchange means in a path other than that previously taken by said first stream and said second stream flows and which third stream flow is subsequently discontinued and the initially specified flow of said first stream and said second stream is reestablished the improvement comprising, reducing the pressure in said other path by connecting said other path to said low pressure portion of said circuit during the periods said first stream and said second stream flows occur.

2. A method of separating the gaseous components of a mixture of gases in which a first stream of a mixture of gases flows in heat exchange relationship in a heat exchange means with a second stream and said first and second stream flows are subsequently discontinued and a third stream from the high pressure portion of a circuit having high pressure and low pressure portions at said high pressure and at a temperature substantially different from the temperature of said first stream and from the temperature of said second stream is passed through said heat exchange means in a path other than that previously taken by said first stream and said second stream flows, and which third stream flow is subsequently discontinued and the initially specified flow of said first stream and said second stream is reestablished the improvement comprising, reducing the pressure in said other path to a pressure substantially equal to said low pressure during the periods said first stream and said second stream flows occur.

3. A continuous method of separating the gaseous components of a mixture of gases including, passing a stream of a mixture of gases in heat exchange relationship in one portion of a heat exchange means with a second stream, subsequently discontinuing said mixture and said second stream flows and reestablishing such flows in a second portion of said heat exchange means and passing a third stream in heat exchange relationship with a fourth stream from the high pressure portion of a circuit having high pressure and low pressure portions in said one portion of said heat exchange means with said fourth stream being at said high pressure and flowing through a path other than that of said mixture and said second stream in said one portion of said heat exchange means and with said third stream flowing through the path previously taken by said mixture, subsequently discontinuing said third and fourth stream flows in said one portion of said heat exchange means and reestablishing the initially specified flow of said mixture and said second stream in said one portion of said heat exchange means and establishing the specified flow of said third and fourth stream flows in said second portion of said heat exchange means with said fourth stream being at said high pressure and flowing through a path other than that of said mixture and said second stream in said second portion of said heat exchange means and with said third stream flowing through the path in said second portion of said heat exchange means previously taken by said mixture and, reducing the pressure in the separate paths of said fourth stream flows in said one and said second portions of said heat exchange means respectively to a pressure substantially equal to said low pressure when said mixture and said second stream flows occur therein.

References Cited by the Examiner

UNITED STATES PATENTS

| | | | |
|---|---|---|---|
| 2,534,478 | 12/50 | Roberts | 62—38 X |
| 2,763,138 | 9/56 | Tsunoda | 62—13 |
| 2,932,174 | 4/60 | Schilling | 62—13 |
| 2,955,434 | 10/60 | Cost | 62—13 |
| 2,960,836 | 11/60 | Haringhuizen | 62—13 |
| 3,036,439 | 5/62 | Haringhuizen | 62—13 |
| 3,060,697 | 10/62 | Collins | 62—13 |

FOREIGN PATENTS 1,059,480  6/59  Germany.

NORMAN YUDKOFF, *Primary Examiner.*

ROBERT A. O'LEARY, *Examiner.*